United States Patent [19]

Yew et al.

[11] Patent Number: 4,570,902
[45] Date of Patent: Feb. 18, 1986

[54] EVAPORATION CANISTER FLOW RATE VALVE

[75] Inventors: Kwang Yew; Ron Mitchell, both of Chatham, Canada

[73] Assignee: Allied Corporation, Morris Township, N.J.

[21] Appl. No.: 653,647

[22] Filed: Sep. 21, 1984

[51] Int. Cl.[4] ............................................. F16K 31/06
[52] U.S. Cl. .............................. 251/129.15; 335/281
[58] Field of Search .................. 251/141, 129; 335/281

[56] References Cited

U.S. PATENT DOCUMENTS

| | | | |
|---|---|---|---|
| 3,108,777 | 10/1963 | Ray | 251/129 X |
| 3,295,079 | 12/1966 | Brown | 251/129 X |
| 3,331,042 | 7/1967 | Erickson et al. | 251/129 X |
| 3,757,263 | 9/1973 | Saarem et al. | 251/129 X |
| 3,929,315 | 12/1975 | Rieth | 251/129 |
| 4,238,110 | 12/1980 | McCabe | 251/141 X |
| 4,320,781 | 3/1982 | Bouvet | 251/141 X |
| 4,445,528 | 5/1984 | Miki et al. | 251/141 X |

Primary Examiner—Arnold Rosenthal
Attorney, Agent, or Firm—Markell Seitzman; Russel C. Wells

[57] ABSTRACT

A valve (10) comprising a first (16) and a second port (18), a valve seat (20) positioned about an axis in communication with one of the ports (16, 18), electromagnetic means (40, 42, 92, 96, 98, 100, 102, 110) for defining a preferred magnetic flux path for selectively opening and closing communication through the valve seat (20) comprising means (110) for directing the magnetic flux to flow around the coil including a metallic strap (110) positioned in surrounding relation to the coil. The valve including piston means (96, 98, 100, 102) including a piston (96) aligned with the valve seat including a spring (100) for biasing the piston (96) towards the valve seat, the piston moveable in response to magnetic flux and a metallic element (92) being substantially aligned to the piston and including one end positioned apart from and adjacent to the spring forming part of the magnetic flux path, and another end in contacting engagement with the metallic strap.

19 Claims, 6 Drawing Figures

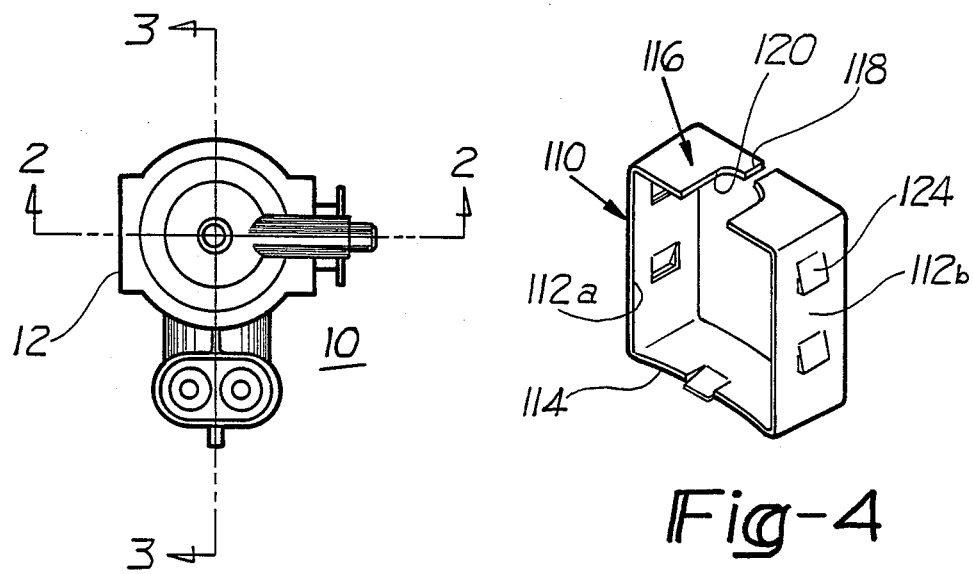
Fig-1
Fig-4
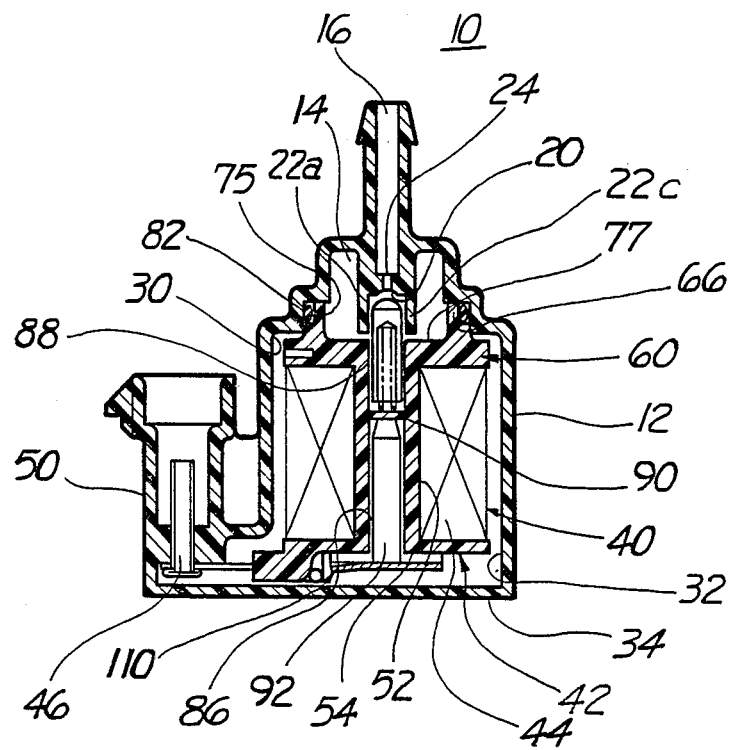
Fig-3

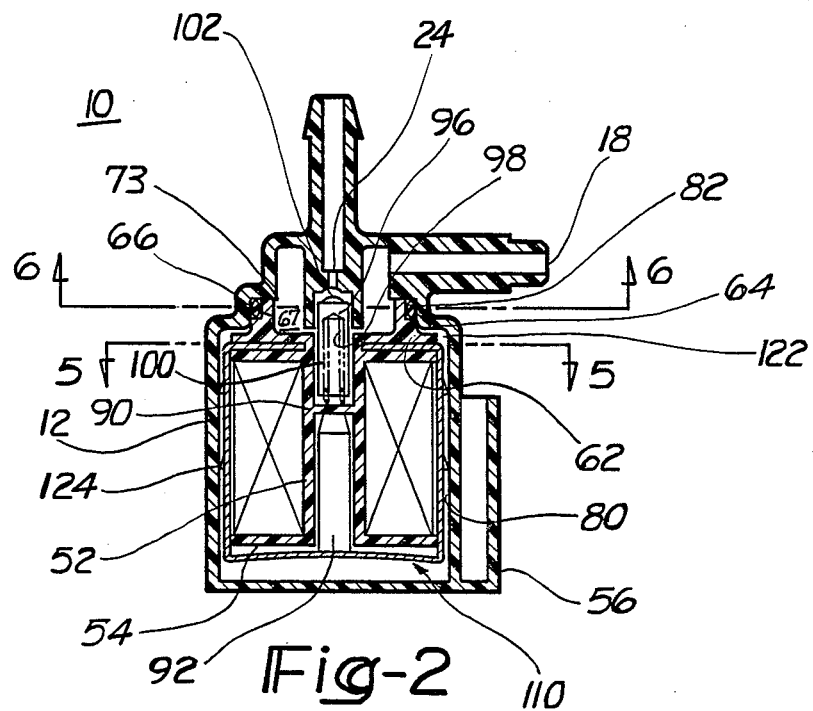
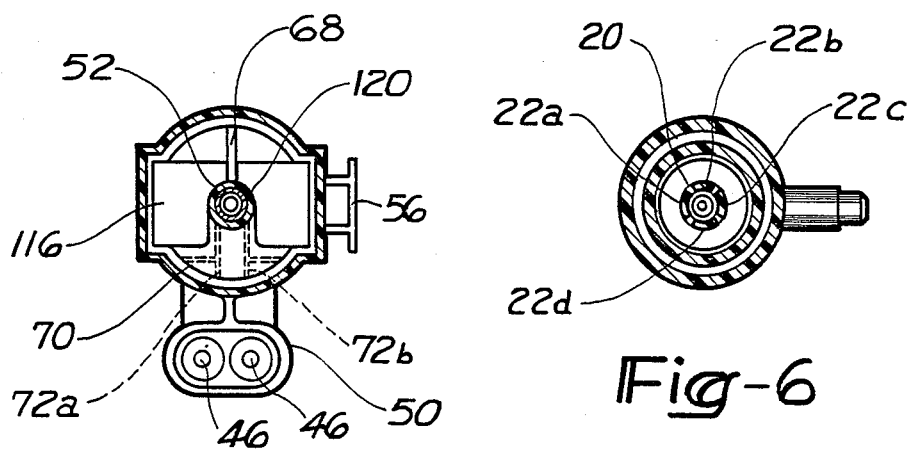

EVAPORATION CANISTER FLOW RATE VALVE

BACKGROUND AND SUMMARY OF THE INVENTION

The present invention generally relates to solenoid valves and more particularly to an improved valve which varies the rate at which hydrocarbons can be removed from an evaporation canister.

An evaporation canister forms a part of an emission control system of an internal combustion engine. When the engine is turned off hydrocarbons in the intake manifold of the engine and the fuel tank are communicated to the evaporation canister which contains a filtering element. Upon starting the engine the free hydrocarbons within the evaporation canister are returned to the intake manifold through a return tube where they are combusted. In order to prevent an excessive amount of hydrocarbons from appearing in the exhaust when the engine is initially started the rate at which the hydrocarbons are permitted to flow from the canister to the intake manifold must be controlled. Prior evaporation canister systems have included orifices or vacuum devices in the return line to control the rate at which the hydrocarbons enter the intake manifold. Vacuum devices are deficient for controlling the flow rate in that they often provide only an on/off control. The present invention provides an improved solenoid which varies the flow rate of hydrocarbons to the intake manifold. Such flow rate may be controlled as a function of engine RPM, temperature, manifold vacuum, etc., in cooperation with an electronic control unit of a known type.

It is a requirement of this type of system to control the hydrocarbon flow rate in an accurate and repeatable manner. To control the accuracy of the flow rate, it is necessary to control the magnitude and direction of the magnetic flux generated upon activation of the solenoid which is lodged within the valve's body.

It is, therefore, an object of the present invention to provide such a valve which embodies an improved magnetic circuit. A further object of the present invention is to provide a valve which exhibits accurate and repeatable cycle-to-cycle performance. Another object of the present invention is to provide a valving element which is guided into seating engagement with a corresponding valve seat.

Accordingly, the invention comprises:

A vacuum valve comprising a housing defining an input port in selective communication with an outlet port. The housing defines a valve seat in communication with the outlet port and includes valve guide means circumferentially positioned about the valve seat. The housing further includes a coil assembly cavity and a coil assembly comprising a bobbin including an axially entending column member and a coil circumferentially wound about the column, the upper bore being axially aligned with the valve guide means. The column includes a partially extending lower bore and a partially extending upper bore. The bobbin further comprises a top member which includes means for receiving a metallic strap. A metallic cylinder is positioned within the lower cavity and extends therefrom. A piston is reciprocally located within the upper bore and positioned for sliding engagement with valve guide means for selectively opening and closing communication between the vacuum inlet and the outlet ports in response to a modulated input signal. A metallic strap is positioned within the receiving means about the coil and includes an arcuately shaped bottom for biasing the metallic cylinder within the lower cavity and defines a preferred magnetic flux path which includes the piston and metallic cylinder.

Many other objects and purposes of the invention will be clear from the detailed description of the drawings.

BRIEF DESCRIPTION OF THE DRAWINGS

In the drawings:

FIG. 1 illustrates a top view of an evaporation canister flow rate valve

FIG. 2 illustrates a cross-sectional view of a flow rate valve.

FIG. 3 is another cross-sectional view of the invention.

FIG. 4 illustrates a projected view of a metallic strap utilized within the valve of FIGS. 2 and 3.

FIG. 5 illustrates a cross-sectional top view illustrating a bobbin and the magnetic strap in an interlocking relation.

FIG. 6 illustrates a sectional view through section 6—6 of FIG. 2.

DETAILED DESCRIPTION OF THE DRAWINGS

With reference to FIGS. 1-3, there is illustrated a flow rate valve 10 including a housing 12 that is preferably constructed of a non-magnetic, non-electric material such as plastic. The housing 12 defines at its upper extreme, as is viewed in FIG. 2, a pressure chamber 14 that is communicated to a source of vacuum, such as the intake manfold of an engine, through a vacuum port 16. The housing 12 further includes an inlet port 18 which is adapted to preferably fit directly into an evaporation canister of a known type (not shown). Formed within the upper portion of the housing 12 is a preferably frusto-conically shaped valve seat 20. Extending axially downward from the housing 12 in surrounding relation to the valve seat 20 are a plurality of axially extending ribs or fingers 22a-d. FIG. 2 illustrates two of these ribs (22a and 22c). The remaining ribs 22b and 22d are illustrated in FIG. 6. Intersecting the valve seat 20 is a control orifice 24 which communicates with the outlet port 16 formed within the housing 12. The housing 12 further defines a centrally located coil cavity 30 having an open end 32 through which a coil assembly 40 is inserted. The cavity 30 is closed by a bottom element 34. The coil assembly 40 comprises a bobbin 42, an electromagnetic coil 44 and a plurality of terminals 46 which are connected to the ends of the coil 44. (Only one of such terminals 46 are illustrated in FIG. 2). The terminals 46 are protected by a sleeve 50 which may be integrally molded as part of the housing 12. A bracket 56 may be formed as part of the housing 12.

The bobbin 42 includes a centrally positioned axially extending column 52 which supports a bottom disk 54 and a top member, generally shown as 60. The axially extending column 52 comprises a lower bore 86 and an upper bore 88. The bores 86 and 88 are separated by a layer of material generally designed as member 90 which is preferably part of the column 52. The bores 86 and 88 are preferrably coaxially aligned and of the same dimension, however, this is not a requirement of the invention. The top member 60 comprises a lower disk 62 and an upper element 64 which radially extend about the upper bore 88 or column 52. The upper element 64 and the lower disk 62 are maintained in a spaced relation by a plurality of supports (68,70,72) which are illustrated in FIG. 5. More specifically, these supports may comprise at least one radially extending member 68 and a wall 70 situated perpendicularly thereto and a plurality of supports 72a–b. The upper element 64 of the top member 60 is formed by an annular wall 66 which extends axially forming a cup-like cavity 67 which forms part of the pressure chamber 14.

The upper surface 77 of the top element 64 is maintained in a spaced relation relative to the extending valve guide members 22a–d by a circumferentially positioned shoulder 73 which coact with the end 75 of the wall 66. The pressure chamber 14 is isolated from the local environment by insertion of an O-ring 82 between the annular wall 66 and the inner wall 80 of the housing 12.

Inserted within the lower bore 86 and positioned against member 90 and extending out from the lower disk 54 is a ferromagnetic, cylinder 92. Reciprocatively positioned within the upper bore 88 is a piston 96 which is movable in response to the magnetic flux generated upon activation of the coil 44. The piston 96 comprises a partially extending bore 98 into which is received a spring 100 which is lodged upon the member 90 to bias the piston 96 upward toward the valve seat 20. The upper extreme of the piston 96 comprises a spherically shaped, preferably compliant, valve element 102 such as rubber, which is urged against the valve seat 20 to close off the orifice 24 by action of the spring 100.

The valve 10 further includes a magnetic strap generally indicated as 110, shown in FIG. 4, which comprises a metallic, open rectangle having sides 112, an inwardly extending arcuate bottom 114 and a split top element generally indicated as 116. The top 116 is preferably slotted at 118 and further includes a substantially oval cut-out 120. The magnetic strap 110 is received within the slot 122 formed between the lower disk 62 and upper element 64 of the bobbin as illustrated in FIG. 2. In its assembled position, the bottom 114 is spaced from the bottom disk 54 and due to its arcuate shape spring loads the metallic cylinder 92 into the bore 86. The oval cut-out 120 permits the strap 110 to be positioned in surrounding abutting relation relative to the column 52 while the slot 118 permits the strap 110 to be slidably received about the rib or member 68. The sides 112a and b of the strap 110 may be formed with extending tabs 124 which provide for a press fit engagement against the interior wall 80 of the housing 12 which in turn cooperates to bias the top 116 inwardly against the column 52 thus minimizing any air gaps between the elements of the top 116 in its assembled position.

FIGS. 2 and 3 illustrate the valve 10 in its activated condition, where the magnetic force generated by the coil 44 has urged the piston 96 from its valve seat 20 thus opening communication between the vacuum port 16 and the inlet port 18. Upon removal of electric signals to the coil 44, the piston 96 is moved into sealing engagement by the force of the spring 100 and is guided into proper engagement upon the valve seat 20 by the valve guides 22a and d. The electrical signals may be of any variety of conventional waveform. To achieve a variable flow of hydrocarbons from the evaporation canister a variable pulse width signal may be preferred.

Many changes and modifications in the above-described embodiment of the invention can, of course, be carried out without departing from the scope thereof. Accordingly, that scope, is intended to be limited only by the scope of the appended claims. As an example, the bores 86 and 88 may be off-set and of different dimension. Similarly the piston 96 and metallic cylinder 92 may be of different dimensions. Further, the top 116 need not be bifurcated. The slot 118 may only extend partially through the top 116 or be removed altogether, this of course would require modification of the size of the rib 68.

We claim:

1. A valve comprising a housing which includes a first or inlet port in selective communication with a second or outlet port, the housing defining a valve seat in communication with the first input port and valve guide means circumferentially positioned about said valve seat, said housing further includes a coil assembly cavity for receiving a coil assembly; said coil assembly comprising a bobbin including an axially extending column and a coil circumferentially wound about said column, said column including a partially extending lower bore and a partially extending upper bore axially aligned with said valve means and a top member which includes means for receiving a magnetic strap means;

a metallic cylinder positioned within said lower bore and extending therefrom;

piston means reciprocatively located within said upper bore, slidably received within said valve guide means and positioned for sealing engagement with said valve seat for selectively opening and closing communication between said first port and said second port in response to control signals input to said coil;

strap means positioned within said receiving means in surrounding relation to said coil for biasing said cylinder into said lower cavity and for establishing a magnetic circuit in concert with said metallic cylinder and said piston means.

2. The valve as defined in claim 1 wherein said strap means further comprises a substantially biforcated top, a plurality of sides extending therefrom in mating engagement with said bottom.

3. The valve as defined in claim 2 wherein said receiving means includes a first slot formed in said top member.

4. The valve as defined in claim 3 wherein said top is slotted and wherein said receiving means further includes a radially extending rib positioned to engage said slotted top of said strap means.

5. The valve as defined in claim 1 wherein said strap means comprises a substantially rectangular strap including a bottom in contacting engagement with said cylinder.

6. The valve as defined in claim 5 wherein said bottom is of an arcuate shape.

7. The valve as defined in claim 1 wherein an orifice is lodged between said valve seat and said inlet port.

8. The valve as defined in claim 5 wherein said valve seat is frusto-conically shaped and wherein an end of said piston conforms to the shape of said valve seat to seat thereon.

9. The valve as defined in claim 8 wherein said piston is biased away from the bottom of said upper bore.

10. The valve as defined in claim 1 wherein said valve guide means comprises a plurality of ribs or members integral with and circumferentially positioned about said valve seat for guiding said piston means into seating engagement with said valve seat.

11. A valve comprising a first port and a second port, a valve seat positioned about an axis in communication with one of said ports, electromagnetic means for defining a preferred magnetix flux path and for selectively opening and closing communication through said valve seat comprising:
  a coil responsive to control signals for generating magnetic flux along said axis;
  means for directing the magnetic flux to flow around said coil including a single metallic strap positioned in surrounding relation to said coil;
  piston means including a piston aligned with said valve seat including a spring for biasing said piston towards said valve seat, said piston movable in response to the magnetic flux and extending through a cooperating opening in said metallic strap;
  a metallic element substantially aligned to said piston and including one end positioned apart from and adjacent to said spring forming part of the magnetic flux path, and another end in contacting engagement with said metallic strap wherein said strap biases said metallic element inwardly.

12. The valve as defined in claim 11 wherein said strap comprises a substantially biforcated top, a plurality of sides extending therefrom in mating engagement with a bottom.

13. The valve as defined in claim 11 wherein said top is slotted.

14. The valve as defined in claim 11 wherein said strap comprises a substantially rectangular strap including a bottom in contacting engagement with said metallic element.

15. The valve as defined in claim 14 wherein said bottom is of an arcuate shape.

16. The valve as defined in claim 11 wherein an orifice is lodged between said valve seat and said inlet port.

17. The valve as defined in claim 16 wherein said valve seat is frusto-conically shaped and wherein an end of said piston conforms to the shape of said valve seat to seat thereon.

18. The valve as defined in claim 11 further including valve guide means extending from said valve seat in sliding engagement with said piston means for guiding said piston means into engagement with said valve seat.

19. The valve as defined in claim 18 wherein said guide means comprises a plurality of ribs or member integral with and circumferentially positioned about said valve seat for guiding said piston means into seating engagement with said valve seat.

* * * * *